(12) United States Patent
Pickens et al.

(10) Patent No.: US 7,314,205 B2
(45) Date of Patent: Jan. 1, 2008

(54) SYSTEM AND METHOD FOR MOUNTING A BREAKER PANEL TO A POLE

(75) Inventors: Jon David Pickens, Atlanta, GA (US); Arthur Kevin Shumate, Duluth, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 78 days.

(21) Appl. No.: 11/341,340

(22) Filed: Jan. 26, 2006

(65) Prior Publication Data
US 2006/0266911 A1 Nov. 30, 2006

Related U.S. Application Data

(60) Provisional application No. 60/685,994, filed on May 31, 2005.

(51) Int. Cl.
*A47B 97/00* (2006.01)

(52) U.S. Cl. .......... 248/507; 335/202; 248/205.1; 361/664; 361/665; 174/535

(58) Field of Classification Search .......... 335/202; 248/205.1; 361/664
See application file for complete search history.

(56) References Cited

U.S. PATENT DOCUMENTS

| | | | | |
|---|---|---|---|---|
| 1,156,885 A * | 10/1915 | Caine | .......... | 248/218.4 |
| 2,956,106 A * | 10/1960 | Hasselhorn et al. | .......... | 174/59 |
| 3,868,080 A * | 2/1975 | Olson | .......... | 248/205.1 |
| 4,864,467 A * | 9/1989 | Byrd et al. | .......... | 361/664 |
| 4,878,160 A * | 10/1989 | Reneau et al. | .......... | 362/269 |
| 4,934,644 A * | 6/1990 | Nagy et al. | .......... | 248/230.8 |
| 4,967,990 A * | 11/1990 | Rinderer | .......... | 248/205.1 |
| 5,044,582 A * | 9/1991 | Walters | .......... | 248/57 |
| 5,213,413 A | 5/1993 | Weathers | | |
| 5,275,368 A | 1/1994 | Hall | | |
| 5,303,894 A * | 4/1994 | Deschamps et al. | .......... | 248/343 |
| 5,377,074 A * | 12/1994 | Byrd | .......... | 361/664 |
| 5,400,212 A | 3/1995 | Hanson | | |
| 5,426,577 A | 6/1995 | Gordin | | |
| 5,726,507 A | 3/1998 | Tipton | | |
| 5,927,667 A * | 7/1999 | Swanson | .......... | 248/300 |
| 5,954,304 A * | 9/1999 | Jorgensen | .......... | 248/200.1 |
| 6,185,303 B1 * | 2/2001 | Losey | .......... | 379/454 |
| 6,209,836 B1 * | 4/2001 | Swanson | .......... | 248/300 |
| 6,332,597 B1 * | 12/2001 | Korcz et al. | .......... | 248/343 |
| 6,550,170 B1 * | 4/2003 | Cooper et al. | .......... | 40/607.12 |
| 6,765,787 B2 * | 7/2004 | Beasley et al. | .......... | 361/641 |
| 6,969,034 B2 * | 11/2005 | Ware et al. | .......... | 248/218.4 |
| 6,974,908 B2 * | 12/2005 | White | .......... | 174/50 |
| 6,988,697 B2 * | 1/2006 | Ware et al. | .......... | 248/218.4 |
| 7,059,572 B2 * | 6/2006 | Ware et al. | .......... | 174/535 |
| 7,085,128 B2 * | 8/2006 | Wilfong | .......... | 361/665 |

* cited by examiner

*Primary Examiner*—Elvin Enad
*Assistant Examiner*—Mohamad A Musleh

(57) ABSTRACT

Certain exemplary embodiments can provide a system that can comprise one or more brackets adapted to be coupled to a panel. The bracket can define a collar adapted to slideably couple the panel to a pole. The bracket can be adapted to restrain rotational motion of the panel about a longitudinal axis of the pole.

20 Claims, 2 Drawing Sheets

SYSTEM AND METHOD FOR MOUNTING A BREAKER PANEL TO A POLE

CROSS-REFERENCES TO RELATED APPLICATIONS

This application claims priority to pending U.S. Provisional Patent Application Ser. No. 60/685,994, filed May 31, 2005.

BACKGROUND

Hanson (U.S. Pat. No. 5,400,212) allegedly recites a "reconstruction utility meter pedestal for the purpose of providing underground electrical and communication service to a building construction site after a foundation has been constructed but before a building has been erected upon the foundation. The pedestal comprises an elongated, vertical electrical service rigid steel conduit for conducting electrical service from an underground electrical service system to a utility meter box mounted on the upper end of the conduit and having an electric meter mounted therein. The rigid steel conduit is adapted to be fastened by an upper and a lower mounting plate, respectively, to the front face of the foundation. A communication cable plastic conduit, and a temporary electrical power box are carried by the electrical service rigid steel conduit. The electrical service rigid steel conduit supports a telephone interface box mounting bracket for the reception of an interface telephone box." See Abstract.

Gordin (U.S. Pat. No. 5,426,577) allegedly recites "[p]ole mounted lighting system including mounting components to mount such things as an integrated multiple cross-arm assembly to a pole, a remote ballast box to the pole, or an integrated cross-arm ballast box to the pole. The mounting structures include adjustable connection members which allow customization of fit to different size poles." See Abstract.

Tipton (U.S. Pat. No. 5,726,507) allegedly recites an "electrical interface provides a permanent electrical facility electrically connected to a temporary electrical facility which provides electrical utilities to construction sites which can be activated by a non-utility qualified individual. The electrical interface generally comprises (a) permanent electrical facilities that provide electrical power to a residential neighborhood; and (b) temporary electrical facility electrically connected to the permanent electrical facilities. The temporary electrical facility provide electrical utilities to construction sites which can be activated by a non-utility qualified individual(s). The temporary electrical facility further comprises a non-conductive housing and a base, electrical connectors, and a electrical converter. The nonconductive housing fits over and doses the base. Alternate temporary electrical facilities comprise a pole, electrical connectors, and an electrical converter. Electrical connectors are positioned on an exterior surface of the non-conductive housing or pole. The electrical connectors having a connection switching element, which is familiar to an electrician and easily activated. The electrical converter converts the first interface wiring to the second interface wiring. The first interface wiring electrically connects the electrical converter to the permanent electrical facilities, whereas the second interface wiring electrically connects the connection switching element of the electrical connectors to the electrical converter. Preferred processes of installing the electrical interface generally comprise digging a trench and placing the conduit holding the electrical cable therein. And, if necessary, the additional step of digging a hole may be added to hold the preferred embodiment. Also, if needed, the existing cover is removed and replaced with an appropriate cover for the particular structure." See Abstract.

SUMMARY

Certain exemplary embodiments can provide a system that can comprise one or more brackets adapted to be coupled to a panel. The bracket can define a collar adapted to slideably couple the panel to a pole. The bracket can be adapted to restrain rotational motion of the panel about a longitudinal axis of the pole.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
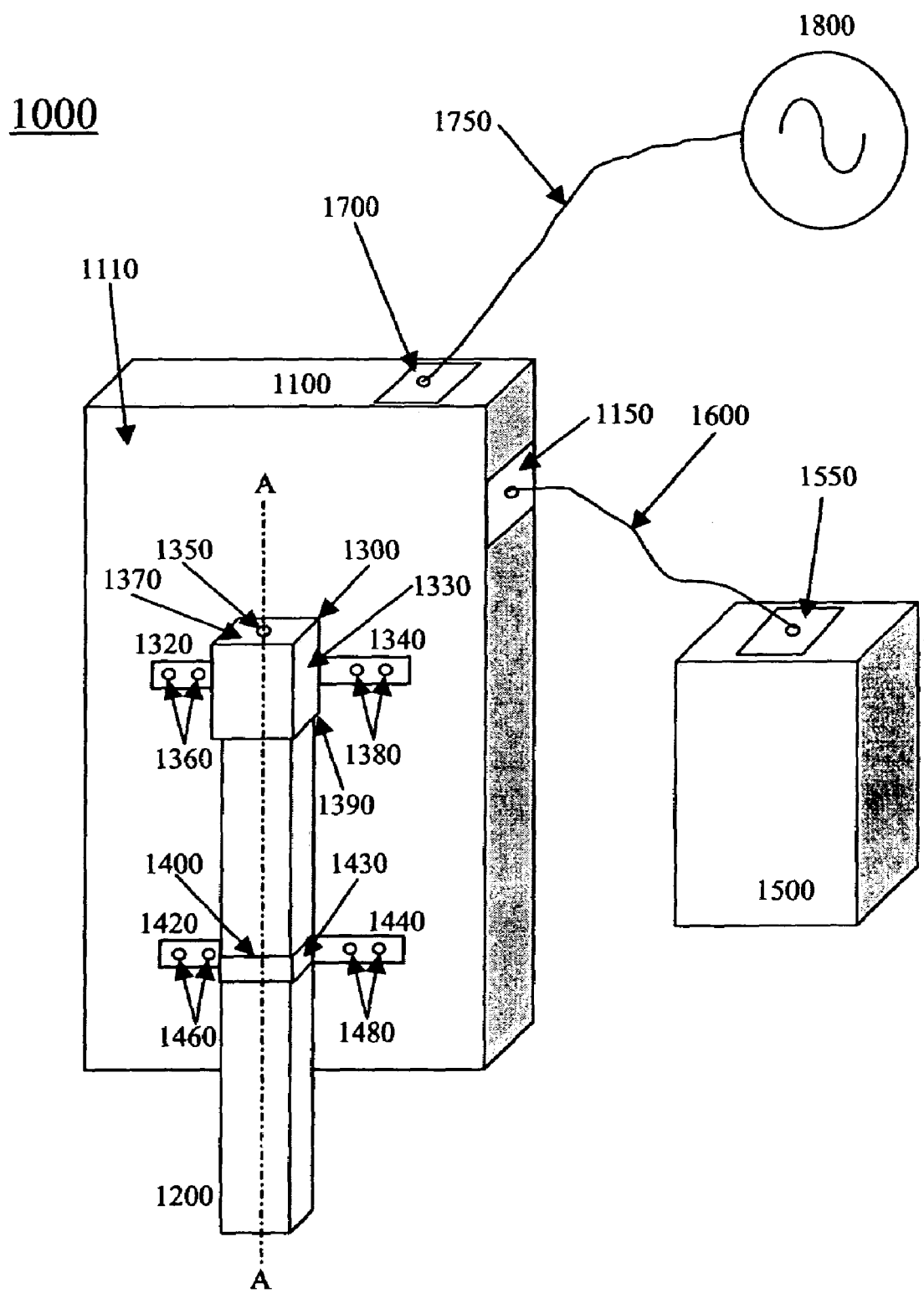
FIG. 1 is a perspective view of an exemplary embodiment of a system 1000.

When the following terms are used substantively herein, the accompanying definitions apply:

a—at least one.
activity—an action, act, step, and/or process or portion thereof.
adapted to—made suitable or fit for a specific use or situation.
adapter—a device used to effect operative compatibility between different parts of one or more pieces of an apparatus or system.
adjacent—near.
and/or—either in conjunction with or in alternative to.
apparatus—an appliance or device for a particular purpose
applying—to put to use for a purpose.
approximately—nearly the same as.
area—a surface with determinable boundaries.
border—to be located and/or positioned adjacent to an outer edge, surface, and/or extent of an object.
bracket—a weight bearing and/or motion restraining structural component. A bracket can be made of plastic material, aluminum, stainless steel, and/or painted carbon steel, etc.
breaker panel—a housing adapted to contain electrical components, such as a circuit interrupter, meter, and/or circuit breaker, adapted to manage electrical energy to an electrical device and/or in a circuit.
can—is capable of, in at least some embodiments.
cap—a cover.
collar—a shaped object defining a cavity adapted to at least partially encase another object.
comprising—including but not limited to.
connect—to join or fasten together.
construction site—a location at which building takes place.
couple—to join, connect, and/or link together.
coupleable—capable of being joined, connected, and/or linked together.

coupling—linking in some fashion.
cylindrical—characterized by a substantially circular cross section.
define—to establish the outline, form, or structure of.
device—a machine, manufacture, and/or collection thereof.
direction—a distance independent relationship between two points in space that specifies the position of either with respect to the other; the relationship by which the alignment or orientation of any position with respect to any other position is established.
electrical—pertaining to electricity.
energy—usable power.
external—relating to, existing on, and/or connected with the outside or an outer part.
fasten—to attach to something else and/or to hold something in place.
fastener—one (or more) restraint that attaches to, extends through, penetrates, and/or holds something. For example, a fastener can be one (or more) bolt and nut assembly, rivet, weldment, nail, screw, peg, staple, clip, buckle, clasp, clamp, hook and loop assembly, adhesive, and/or plastic push rivet, etc.
flange—a protruding rim, edge, rib, or collar.
install—to connect or set in position and prepare for use.
length—a measurement of a greatest dimension of an object.
longitudinal axis—a straight line defined parallel to an object's length and passing through a centroid of the object.
loosely—having sufficient clearance to allow motion with relatively little resistance in at least one direction.
manage—to direct or control.
may—is allowed and/or permitted to, in at least some embodiments.
method—a process, procedure, and/or collection of related activities for accomplishing something.
motion—changing position or place.
obtain—to receive, calculate, determine, and/or compute.
opposing—opposite to and/or pointing or facing away from each other.
panel—a housing adapted to contain components.
partially—to a degree.
perimeter—the outer limits or boundary of an object.
perpendicular—substantially at a right angle with respect to an axis.
planar—shaped as a substantially flat two-dimensional surface.
plurality—the state of being plural and/or more than one.
pole—a long relatively slender rod or piece of material. A pole can be fabricated from a plastic material, wood, aluminum, stainless steel, and/or painted carbon steel, etc. A pole can comprise any cross-sectional profile such as substantially square, substantially round, elliptical, rectangular, trapezoidal, and/or a regular polygon, etc. For example, a pole can be a treated lumber 4×4 of any suitable length.
predetermined—established in advance.
prevent—to keep an event from happening.
profile—a quantitative description of an object.
provide—to furnish and/or supply.
provision—an act of furnishing and/or supplying.
range—an extent of variation.
rectangular—defined by four substantially right angles.
relative—in comparison with.
repeatedly—again and again; repetitively.
rest—to not move and/or be supported by.
restrain—to limit and/or restrict.
rotational—about and/or around an axis.
secure—to fasten.
set—a related plurality.
slideably—a smooth and/or continuous motion of one object relative to another.
substantially—to a great extent or degree.
support—to bear the weight of, especially from below.
surface—an outer boundary of an object or a material layer constituting or resembling such a boundary.
system—a collection of mechanisms, devices, data, and/or instructions, the collection designed to perform one or more specific functions.
top—an uppermost point.
via—by way of and/or utilizing.
wires—insulated strands of an electrically conductive metal

DETAILED DESCRIPTION

Certain exemplary embodiments can provide a system that can comprise one or more brackets adapted to be coupled to a panel. The bracket can define a collar adapted to slideably couple the panel to a pole. The bracket can be adapted to restrain rotational motion of the panel about a longitudinal axis of the pole.

FIG. 1 is a perspective view of an exemplary embodiment of a system 1000, which can comprise a panel 1100. Panel 1100 can be a breaker panel, electrical disconnect, electrical motor starter, and/or fuse box, etc. Panel 1100 can be adapted to manage provision of electrical energy, at least on a temporary basis, to electrical device 1500, such as an electrically powered tool, light, motor, information device, power strip, breaker panel, and/or machine, etc. Panel 1100 can be adapted, for example, to supply electrical energy at a location such as a construction site, sports facility, mobile plant, camp site, recreational facility, trailer home, emergency site, and/or a farm, etc. Panel 1100 can be fabricated from a material such as a plastic material, aluminum, stainless steel, and/or painted carbon steel, etc. Panel 1100 can define a substantially rectangular cross section. Panel 1100 can comprise a plurality of planar surfaces, such as a back planar surface 1110, one or more side planar surfaces, a top planar surface, a bottom planar surface, and/or a front planar surface, etc.

System 1000 can comprise a pole 1200. Pole 1200 can be releasably coupled to panel 1100 via a first bracket 1300 and/or a second bracket 1400. First bracket 1300 and/or second bracket 1400 can comprise a plurality of substantially planar surfaces. First bracket 1300 can be adapted to be coupled to panel 1100 adjacent to a planar surface of panel 1100. For example, first bracket 1300 can be coupled to back planar surface 1110 of panel 1100 by a plurality of fasteners 1360, 1380. First bracket 1300 can comprise a flange 1320 and a flange 1340, which can be adapted to receive plurality of fasteners 1360, 1380.

First bracket 1300 can comprise a substantially closed cap 1370 and/or define a cavity 1390 that can receive an end region of a pole 1200. First bracket 1300 can be adapted to define a collar 1330, which can be external to panel 1100. Collar 1330 of first bracket 1300 can be adapted to slideably couple panel 1100 to pole 1200. During a coupling of panel 1100 to pole 1200 via first bracket 1300, collar 1330 can be adapted to slide over pole 1200 and come to a stop. Closed cap 1370 of first bracket 1300 can be adapted to substantially cover a top of pole 1200.

Pole 1200 can define a longitudinal axis A-A that extends in a first direction, such as downward, and in an opposing second direction, such as upward. First bracket 1300 can be adapted to restrain motion of panel 1100 relative to pole 1200 in the first direction, yet can allow motion of panel 1100 relative to pole 1200 in the second direction. Collar 1330 of first bracket 1300 can be adapted to restrain motion of panel 1100 relative to pole 1200 perpendicular to longitudinal axis A-A.

First bracket 1300 can be adapted to restrain rotational motion of panel 1100 about longitudinal axis A-A. In certain exemplary embodiments, a fastener 1350, which can be adapted to restrain motion of panel 1100 relative to pole 1200 in the first and/or second direction. While fastener 1350 is shown in a particular position in system 1000, fastener 1350 can interact with any part of first bracket 1300. In certain exemplary embodiments, one or more of fasteners 1360, 1380 can be adjustable to clampably restrain motion of panel 1100 relative to pole 1200 in the second direction.

Second bracket 1400 can be adapted to be coupled to panel 1100 adjacent to a planar surface of panel 1100, such as the back planar surface 1110 of panel 1100. Second bracket 1400 can be coupled to pole 1200 via a plurality of fasteners 1460, 1480. Second bracket 1400 can comprise a flange 1420 and a flange 1440, which can be adapted to receive plurality of fasteners 1460, 1480.

Second bracket 1400 can be adapted to define a collar 1430, which can be external to panel 1100. Collar 1430 of second bracket 1400 can be adapted to border and/or nearly border at least a portion of a perimeter of pole 1200. Second bracket 1400 can be adapted to slideably couple panel 1100 to pole 1200. Second bracket 1400 can be adapted to restrain motion of panel 1100 relative to pole 1200 perpendicular to longitudinal axis A-A. Second bracket 1400 can be adapted to restrain rotational motion of panel 1100 about longitudinal axis A-A. In certain exemplary embodiments, second bracket 1400 is not adapted to restrain motion of panel 1100 relative to pole 1200 in the first direction. In certain exemplary embodiments, second bracket 1400 is not adapted to restrain motion of panel 1100 relative to pole 1200 in the second direction.

A length of collar 1330 and/or collar 1430 measured parallel to longitudinal axis A-A can be related to an extent of restraint of motion of panel 1100 relative to pole 1200 perpendicular to longitudinal axis A-A. For example, if the length of collar 1330 and/or collar 1430 is less and/or significantly less than approximately a width of pole 1200, panel 1100 will be less restrained than if the length of collar 1330 and/or collar 1430 is greater and/or significantly greater than approximately the width and/or diameter of pole 1200. If the width and/or diameter of pole 1200 is designated as W, the length of collar 1330 and/or collar 1430 can be approximately 0.05 W, 0.2 W, 0.45 W, 0.5 W, 0,92 W, 1.0 W, 2.4 W, 3 W, 4 W, 7.5 W, 9 W, 10.7 W, 12 W, etc., and/or any value therebetween. Moreover, the degree of restraint of motion of panel 1100 relative to pole 1200 perpendicular to longitudinal axis A-A can be related to a closeness of fit of collar 1330 and/or collar 1430 to pole 1200. For example, if collar 1330 and/or collar 1430 are only a millimeter larger dimensionally than pole 1200, panel 1100 will be restrained to a greater extent than if collar 1330 and/or collar 1430 are over a centimeter larger in each dimension as compared to pole 1200. Collar 1330 and/or collar 1430 can be larger in a width or depth than pole 1200, in millimeters, by approximately 1, 2.5, 8, 44, 56.5, 125, 458.5, 756, 989.3, 1500, and/or any value therebetween.

In certain exemplary embodiments, collar 1330 can be used without collar 1430. In certain such embodiments, the length of collar 1330 can be extended such that collar 1330 alone can resist substantial perpendicular movement and/or rotation of collar 1330 relative to longitudinal axis A-A.

Panel 1100 can comprise a releasably attachable cover 1150, which can be adapted to be a port for a wire 1600. In certain exemplary embodiments, panel 1100 can comprise a port for electrical wires without attachable cover 1150. Wire 1600 can be electrically coupled to panel 1100 and/or an electrical subcomponent therein.

Electrical device 1500 can comprise a cover 1550, which can be adapted to be a port for wire 1600. Wire 1600 can be electrically coupled, through cover 1550, to electrical device 1500 and/or an electrical subcomponent therein. In certain exemplary embodiments, electrical device 1500 can comprise a port for electrical wires without cover 1550. Although one wire is shown for illustrative purposes, wire 1600 can comprise any number of individual wires.

System 1000 can be electrically coupled to a supply of electrical energy 1800 via a wire 1750. Panel 1100 can comprise an attachable cover 1700, which can comprise a port adapted to receive wire 1750. In certain exemplary embodiments, panel 1100 can comprise a port for electrical wires without attachable cover 1700. In certain exemplary embodiments, wire 1750 can be a plurality of wires.

Figure 2:
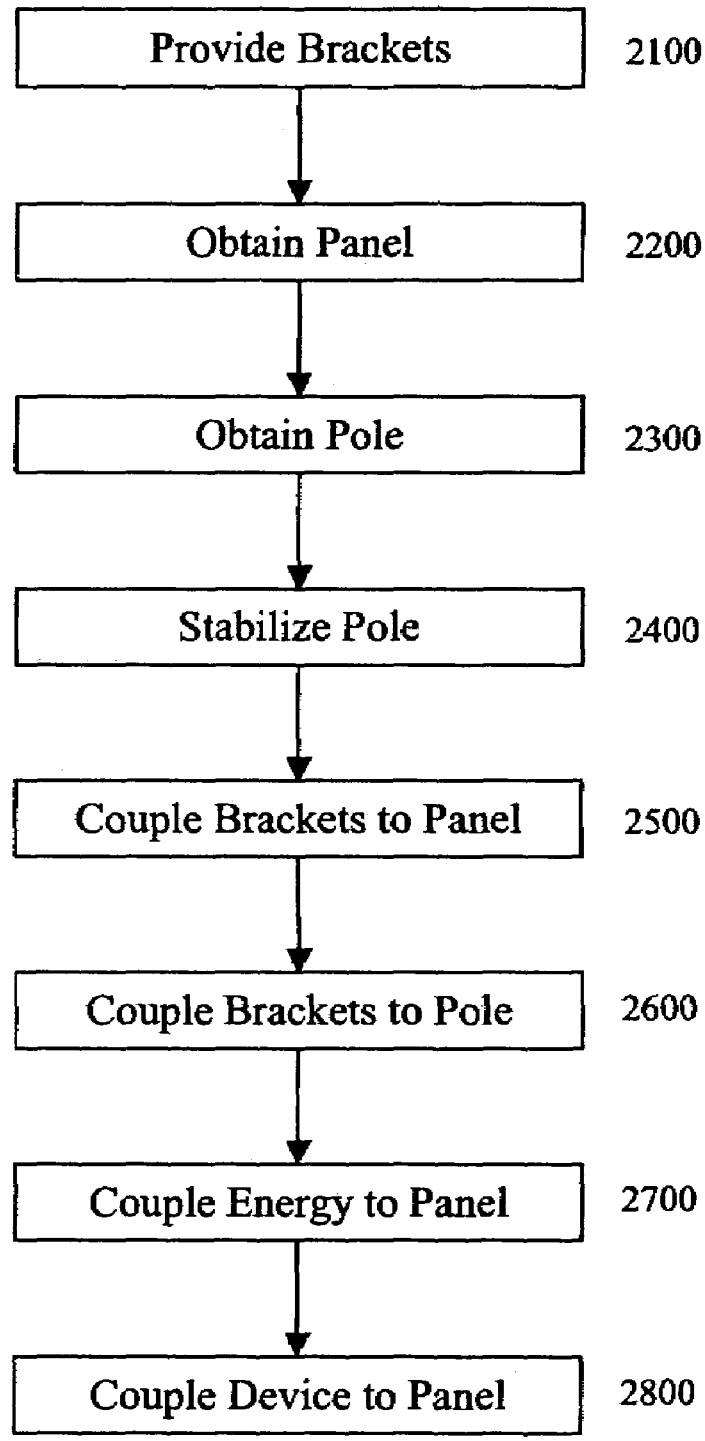
FIG. 2 is a block diagram of an exemplary embodiment of a method 2000.

FIG. 2 is a flowchart of an exemplary embodiment of a method 2000. At activity 2100, brackets can be provided to releasably couple a panel to a pole. The brackets can comprise a first bracket adapted to be coupled to the panel adjacent to a planar surface of panel. The first bracket can be adapted to define a collar external to the panel. The brackets can comprise a second bracket adapted to be coupled to the panel adjacent to the planar surface of the panel. The second bracket can be adapted to define a second collar external to the panel. The second collar can be adapted to at least partially border a perimeter of the pole.

At activity 2200, the panel can be obtained. The panel can be adapted to manage provision of electrical energy to a device. The panel can define a substantially rectangular cross section. The panel can comprise a plurality of parallel planar surfaces. The panel can be adapted to house one or more electrical components such as an electrical breaker, circuit board, fuse assembly, and/or electrical starter, etc. The panel can be adapted to accept a plurality of electrical wires, which can be electrically coupled to an electrical component therein.

At activity 2300, the pole can be obtained. The pole can define a longitudinal axis that extends in a first direction and in an opposing second direction.

At activity 2400, the pole can be stabilized via installation into the ground, attachment to a natural surface, attachment to a man-made surface, placement on a stand, and/or suspension from an overhead structure, etc.

At activity 2500, the brackets can be coupled to the panel, such as via a plurality of fasteners. The brackets can each comprise a flange or a plurality of flanges adapted to accept fasteners to couple the brackets to the panel.

At activity 2600, the brackets can be coupled to the pole. The panel can be slideably coupled to the pole via the collar of the first bracket. The first bracket can be adapted to restrain motion of the panel relative to the pole perpendicular to the longitudinal axis of the pole. The first bracket can be adapted to restrain rotational motion of the panel about the longitudinal axis of the pole. The first bracket can be adapted to restrain motion of the panel relative to the pole in the first direction. In certain exemplary embodiments, the first bracket is not adapted to restrain motion of the panel relative to the pole in the second direction.

The panel can be slideably coupled to the pole via the collar of the second bracket. The second bracket can be adapted to restrain motion of the panel relative to the pole perpendicular to the longitudinal axis of the pole. The second bracket can be adapted to restrain rotational motion of the panel about the longitudinal axis of the pole. In certain exemplary embodiments, the second bracket is not adapted to restrain motion of the panel relative to the pole in the first direction. In certain exemplary embodiments, the second bracket is not adapted to restrain motion of the panel relative to the pole in the second direction.

At activity 2700, electrical energy can be coupled to the panel by a wire or a plurality of wires. Electrical energy can be single phase or three phase power. Electrical energy can be any voltage, such as approximately 110, 220, 460, and/or 1200, etc., volts.

At activity 2800, the electrical device can be electrically coupled to the panel. In certain exemplary embodiments, the electrical device can be associated with construction at a construction site.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A system comprising:
   a first bracket adapted to be coupled to a breaker panel adjacent to a planar surface of said breaker panel, said breaker panel adapted to manage provision of electrical energy to at least one electrical device, said first bracket adapted to define a first collar external to said breaker panel, said first collar adapted to slideably couple said breaker panel to a pole, said pole defining a longitudinal axis that extends in a first direction and in an opposing second direction, said first bracket adapted to restrain motion of said breaker panel relative to said pale in said first direction, said first collar adapted to restrain motion of said breaker panel relative to said pole perpendicular to said longitudinal axis, said first bracket adapted to restrain rotational motion of said breaker panel about said longitudinal axis of said pole, said first bracket not adapted to restrain motion of said breaker panel relative to said pole in said second direction; and
   a second bracket adapted to be coupled to said breaker panel adjacent to said planar surface of said breaker panel, said second bracket adapted to define a second collar external to said breaker panel, said second collar adapted to border at least a portion of a perimeter of said pole, said second bracket adapted to slideably couple said breaker panel to said pole, said second bracket adapted to restrain motion of said breaker panel relative to said pole perpendicular to said longitudinal axis, said second bracket adapted to restrain rotational motion of said breaker panel about said longitudinal axis of said pole, said second bracket not adapted to restrain motion of said breaker panel relative to said pole in said first direction, said second bracket not adapted to restrain motion of said breaker panel relative to said pole in said second direction wherein said first collar comprises a cap adapted to rest against an end of said pole.

2. The system of claim 1, further comprising:
   said breaker panel.

3. The system of claim 1, further comprising:
   said pole.

4. The system of claim 1, further comprising:
   a plurality of fasteners adapted to fasten said breaker panel to said first bracket and said second bracket.

5. The system of claim 1, further comprising:
   a fastener adapted to secure said first bracket to said pole.

6. The system of claim 1, further comprising:
   a plurality of electrical wires adapted to electrically couple said breaker panel to said at least one electrical device.

7. The system of claim 1 further comprising:
   a breaker adapted to be secured in said breaker panel.

8. The system of claim 1, wherein said first bracket is coupled to said breaker panel via a flange.

9. The system of claim 1, wherein said cap is closed.

10. A method comprising:
    providing a first bracket adapted to be coupled to a breaker panel adjacent to a planar surface of said breaker panel, said breaker panel adapted to manage provision of electrical energy to at least one electrical device, said first bracket adapted to define a first collar external to said breaker panel, said first collar adapted to slideably couple said breaker panel to a pole, said pole defining a longitudinal axis that extends in a first direction and in an opposing second direction, said first bracket adapted to restrain motion of said breaker panel relative to said pole in said first direction, said first collar adapted to restrain motion of said breaker panel relative to said pole perpendicular to said longitudinal axis, said first bracket adapted to restrain rotational motion of said breaker panel about said longitudinal axis of said pole, said first bracket not adapted to restrain motion of said breaker panel relative to said pole in said second direction; and providing a second bracket adapted to be coupled to said breaker panel adjacent to said planar surface of said breaker panel, said second bracket adapted to define a second collar external to said breaker panel, said second collar adapted to border at least a portion of a perimeter of said pole, said second bracket adapted to slideably couple said breaker panel to said pole, said second bracket adapted to restrain motion of said breaker panel relative to said pole perpendicular to said longitudinal axis, said second bracket adapted to restrain rotational motion of said breaker panel about said longitudinal axis of said pole, said second bracket not adapted to restrain motion of said breaker panel relative to said pole in said first direction, said second bracket not adapted to restrain motion of said breaker panel relative to said pole in said second direction wherein said first collar comprises a cap adapted to rest against an end of said pole.

11. The method of claim 10, further comprising: obtaining said breaker panel.

12. The method of claim 10, further comprising: attaching said first bracket to said breaker panel.

13. The method of claim 10, further comprising: attaching said second bracket to said breaker panel.

14. The method of claim 10, further comprising: obtaining said pole.

15. The method of claim 10, further comprising: slideably coupling said breaker panel to said pole via said first bracket and said second bracket.

16. The method of claim 10, further comprising: slideably coupling said first bracket to said pole.

17. The method of claim 10, further comprising: slideably coupling said second bracket to said pole.

18. The method of claim 10, further comprising: electrically coupling an electrical energy supply to said breaker panel.

19. The method of claim 10, further comprising: electrically coupling said at least one electrical device to said breaker panel.

20. The method of claim 10, further comprising: electrically coupling said at least one electrical device to said breaker panel, wherein said breaker panel is adapted to supply electrical energy to said at least one electrical device at a construction site.

* * * * *